(12) United States Patent
Oosterhof

(10) Patent No.: US 7,524,058 B2
(45) Date of Patent: Apr. 28, 2009

(54) MAGNIFYING GLASS AS WELL AS A SPECTACLE FRAME PROVIDED WITH ONE OR TWO SUCH MAGNIFYING GLASSES

(75) Inventor: Franciscus Leonardus Oosterhof, Geldrop (NL)

(73) Assignee: E-Scoop B.V., Eindhoven (NL)

(*) Notice: Subject to any disclaimer, the term of this patent is extended or adjusted under 35 U.S.C. 154(b) by 235 days.

(21) Appl. No.: 11/252,201

(22) Filed: Oct. 17, 2005

(65) Prior Publication Data

US 2007/0252948 A1    Nov. 1, 2007

(30) Foreign Application Priority Data

Oct. 18, 2004    (NL) .................................... 1027275

(51) Int. Cl.
G02C 7/02    (2006.01)
G02C 7/06    (2006.01)

(52) U.S. Cl. ..................... 351/159; 351/168; 351/171; 351/175

(58) Field of Classification Search ................ 351/159, 351/168, 175
See application file for complete search history.

(56) References Cited

U.S. PATENT DOCUMENTS

| 5,139,323 | A |   | 8/1992 | Schillo |
|-----------|---|---|--------|---------|
| 5,683,457 | A | * | 11/1997 | Gupta et al. ............... 623/6.26 |
| 5,980,040 | A |   | 11/1999 | Xu et al. |
| 6,139,145 | A |   | 10/2000 | Israel |
| 6,197,057 | B1 | * | 3/2001 | Peyman et al. ............. 623/6.32 |
| 2005/0105047 | A1 | * | 5/2005 | Smitth et al. ................ 351/177 |
| 2006/0229720 | A1 | * | 10/2006 | Glazier et al. ............. 623/6.26 |

* cited by examiner

*Primary Examiner*—Jordan M. Schwartz
(74) *Attorney, Agent, or Firm*—Wood, Phillips, Katz, Clark & Mortimer

(57) ABSTRACT

The invention generally relates to a magnifying glass for a person having limited vision in one or both eyes, wherein the magnifying glass comprises a lens body with a front curve for focusing light rays incident upon the lens body onto the eye. The invention also relates to a spectacle frame provided with one or two magnifying glasses of the invention. The invention is particularly useful to patients suffering from macular degeneration.

14 Claims, 4 Drawing Sheets

MAGNIFYING GLASS AS WELL AS A SPECTACLE FRAME PROVIDED WITH ONE OR TWO SUCH MAGNIFYING GLASSES

FIELD OF THE INVENTION

The invention relates to a magnifying glass for a person having limited vision in one or both eyes, said magnifying glass comprising a lens body having a front curve for focussing light rays incident upon the lens body onto the eye.

The invention further relates to a spectacle frame provided with one or two magnifying glasses according to the invention.

BACKGROUND OF THE INVENTION

The invention is in particular intended for patients suffering from one of a specific group of eye disorders, such as Macular Degeneration, Stardgardt's disease, cataract, pseudophakia, nystagmus, cornea problems, retinal defects and diabetic retinopathy. These patients are troubled by reduced vision, image distortion and sensitivity to light.

The clinical picture of these patients is generally characterized by progressively decreasing vision which, in combination with their other limitations, causes them great problems over the years. Eventually these patients will not go completely blind. The reduced and distorted vision usually starts in the central area in the fovea of the eye or in the cornea and in a later stage of the syndrome extends to the periphery of the fovea.

An eye disorder that is by far the most common is called Macular Degeneration, abbreviated MD. It is a disorder that concerns the central part of the retina, the macula lutea, also referred to as the yellow spot. Typical of MD is, amongst other things, a central scotoma with image distortion, sensitivity to light and a bilateral, progressive loss of the central field of view, the retinal image and a decrease of the number of cones in comparison with the number of rods. A process may be started whereby the cones—which are mainly located in the centre of the retina—start to die. This results in loss of vision, causing the patient's eyesight to become less and less acute. Distortion and—at a later stage—a central scotoma develops centrally in the patient's field of view.

This process is usually age-related, and many people have to face it, partly due to the proportional increase of the ageing population. Usually the disorder is called or considered to be retinal "wear". However, there are other forms not covered by the general term "Macular Degeneration", which forms are not age-related. See FIG. 1 for a view of the image as it is perceived by an MD patient.

Stargardt's disease is one of the eye disorders that cause MD. MD causes damage to the macula, which in turn leads to a decreased visual acuteness. The macula or "yellow spot" is the central part of the retina, which enables a person to see sharply. The macula comprises a large number of cones, the light-sensitive cells that are capable of perceiving contrast and colours and thus enable a person to distinguish details (the central, acute perception), such as recognizing poetry, reading and watching TV. The area around the macula is called the peripheral part, it is this part that enables us to see from the corner of our eyes (peripheral vision). Said peripheral vision enables people to see things to their right and left without turning their head.

Stargardt's disease is caused by a change in a gen, usually the process commences in the seventh year of a person's life. This gen produces a specific protein which functions to remove a harmful substance from the cones. When a person has Stargardt's disease, this process is not carried out properly, as a result of which the cones in the macula gradually die and a person's visual acuteness gradually deteriorates.

In most cases both eyes are affected at the same time, and although a person's visual acuteness can remain constant for some time, there is a possibility of a strong sudden deterioration. In very few cases does Stargardt's disease result in blindness, because the peripheral part of the macula almost invariably remains intact.

Another disorder, called cataract, concerns a clouding of the lens, which may be caused by various factors. Usually the disorder is age-related, but it may also be caused by the intake of cortisons or by diabetes. Transmission of the incoming light through the clouded lens becomes more difficult, so that said light reaches the retina less easily. This leads to a few typical phenomena: vision gradually becomes more blurred. Especially the patient's ability to see far is affected. In most cases, reading is still fairly easy. If the cloudiness is at some places more distinct than at other places, the patient may be troubled by double vision and he or she may be blinded more quickly.

Currently cataract is still treated surgically, and the most recent and most widely used treatment technique is "phacoemulsification". The envelope around the lens is surgically opened, the lens is crushed and the remnants are sucked up. Subsequently, an artificial lens is placed in the free space.

Nystagmus concerns involuntary, rhythmic rapid eye movements in both eyes, usually synchronously. In some cases the eyes oscillate like the pendulum of a clock: this phenomenon is referred to as pendulum nystagmus. The phenomenon whereby the speed of movement in one direction is different from that in the other direction is referred to as jerk nystagmus or sawtooth nystagmus. The eyes float away, as it were, and are pulled back with a rapid, jerky movement.

Nystagmus is also referred to as "wobbly eyes" or "vibrating eyes".

If the patient contracted this disorder at a young age, he will have reduced vision and affected colour vision or, quite the reverse, due to the complete or partial lack of cones and a complete or partial lack of colour vision, the patient's vision will amount to around 10%, which vision is mainly provided by the rods, as a result of which the patient will also be sensitive to light.

A patient who suffers from achromatopsia has no cones in his retina, at least no cones that function. As a result, he is unable to perceive colour and to see sharply, whilst furthermore he is sensitive to an abundance of light.

BRIEF SUMMARY OF THE INVENTION

The object of the invention is to provide a magnifying glass specifically intended for use by, among others, the group of people who suffer from the above disorders and according to the invention the lens body is arranged for focussing light rays incident on the lens body onto the parafoveal part of the fovea of the eye.

In this way the affected portion of the central part of the retina (the fovea) is spared and the patient's vision is obtained by using the outer region of the central part of the retina.

In a special embodiment of the invention, the thickness of the lens body near the lower edge of the magnifying glass is minimally 3.5 mm, more specifically maximally 4.5 mm.

Furthermore, the magnifying glass has a front curve of 7.5-10.5 diopter, and the correction of the front curve of the magnifying glass ranges between −4 diopter and +12 diopter. On the other hand, with such a magnifying glass the front curve and/or the back curve comprises a cylindrical portion, whose correction is maximally +4 diopter.

In another embodiment of the invention, the magnifying glass comprises an addition part at the front curve, whose correction is maximally +3.5 diopter.

This leads to an enlargement of the field of view such that the wearer experiences the image he perceives as steadier than before, whilst in addition he perceives more details. Furthermore the contrast is enhanced and the image perceived by the person in question will exhibit less distortion.

In a further embodiment, the magnifying glass has an Essilor colour number 850 or 885. An incidental circumstance of this yellow colour is the fact that the wearers of such a magnifying glass experience it as very pleasant. Especially daylight burdens the eye to a lesser extent, whilst also UV light constitutes much less of a burden to the eye.

In a specific embodiment, the magnifying glass is tripled non-glare and comprises a prism part having a bilateral prism effect of 3-5 prima with a 90° base. The prism effect of the magnifying glass may be binocular in that case. As a result, the image perceived by the wearer of the magnifying glass is preferably shifted in downward direction.

In various embodiments of the invention the magnifying glass may be a monofocal, a bifocal, a trifocal or a multifocal magnifying glass.

BRIEF DESCRIPTION OF THE DRAWINGS

The invention will now be explained in more detail with reference to a drawing, in which.

DETAILED DESCRPTION OF THE INVENTION

Figure 1:
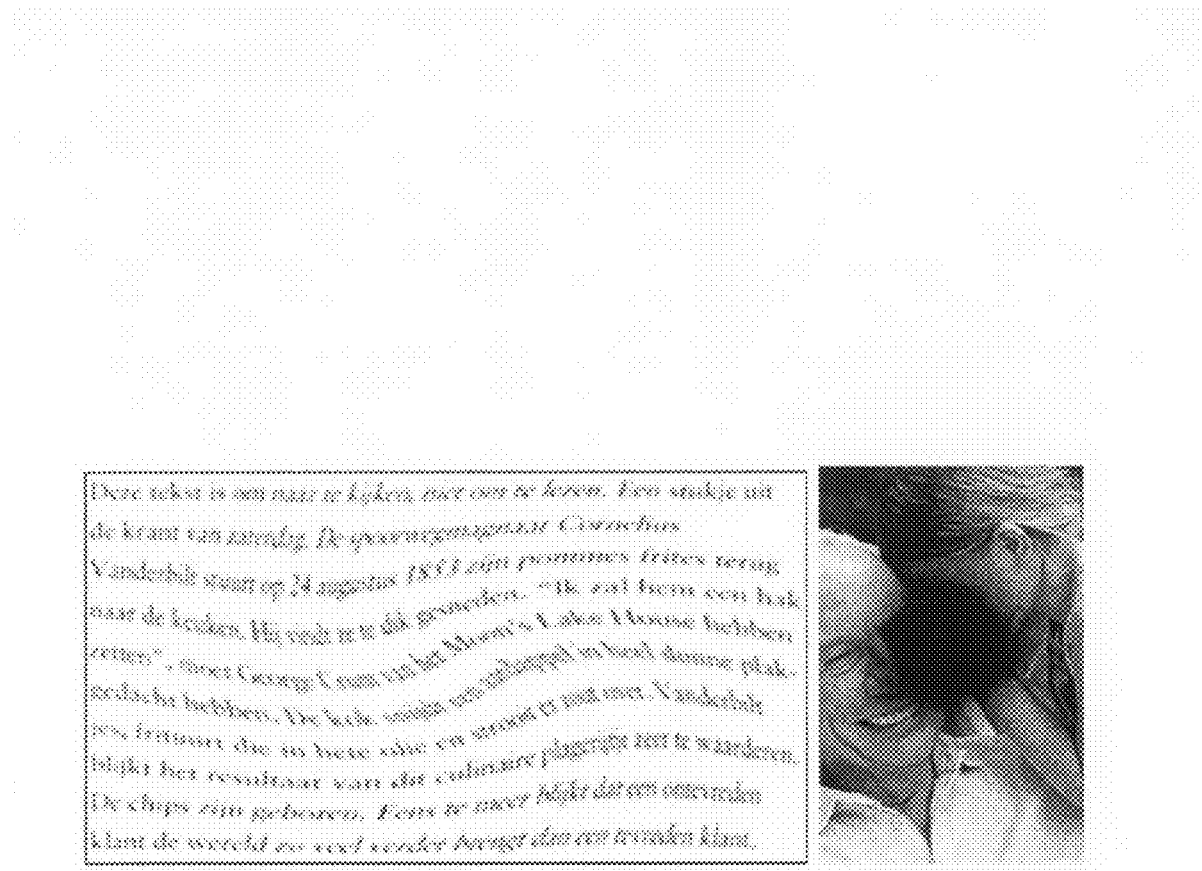
FIG. 1 shows the image as perceived by somebody who suffers from Macular Degeneration.
Figure 2A:
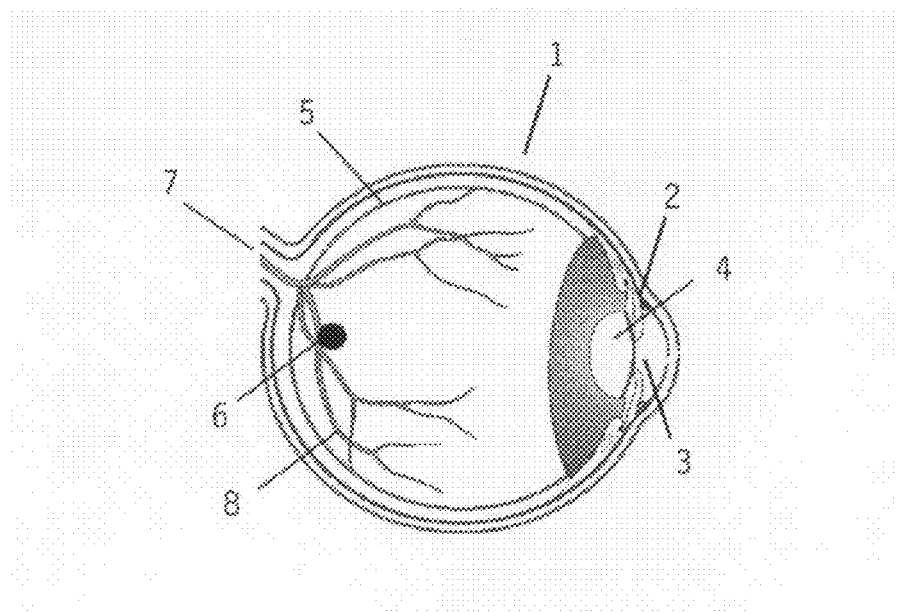
FIGS. 2a and 2b show a normal eye with the path of light beams in the direction of the retina.
Figure 2B:
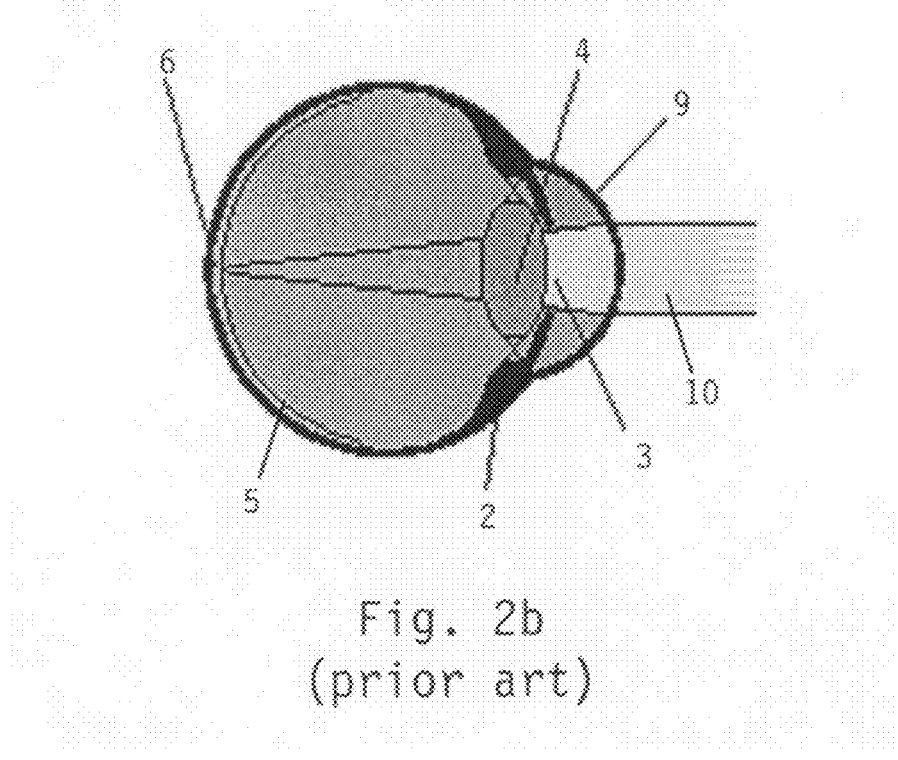

FIGS. 2a and 2b show a normal eye. With a normal eye 1, the incident light 10 on the iris 2 falls on the retina 5 via the cornea 9, the pupil 3 and the lens 4. The retina 5 of a normal eye 1 comprises two kinds of light-sensitive cells: rods and cones. They each have a different function. The cones enable a person to perceive colour. The centre 6 of the retina (the yellow spot or macula or fovea) only comprises a large amount of cones. As a result, a person having normal eyesight can see very acutely in the centre of his field of view. However, cones can only function when there is a sufficient amount of light. In the twilight perception by means of the cones is not possible any more.

In the twilight the rods become active. They are more sensitive to light than the cones and in addition they are linked together in groups so that an even greater signal intensity can be transmitted to the brains via the optic nerve 7. In contrast to the cones, however, rods cannot distinguish colours. No rods are present in the yellow spot 6 where a person's eyesight is sharpest. The rods only occur outside the yellow spot 6. Numeral 8 indicates the blood vessels for the retina 5.

Figure 3:
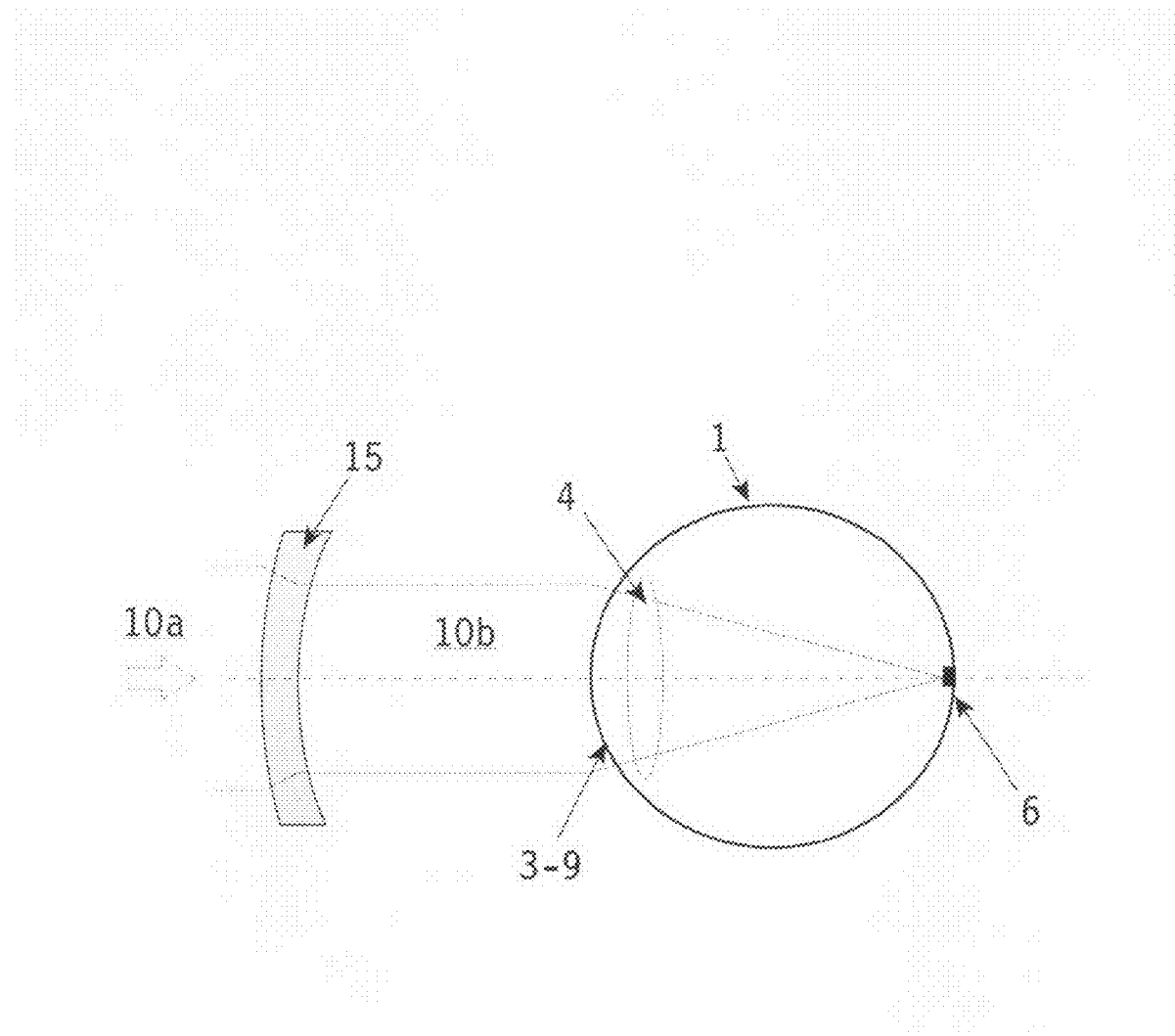
FIG. 3 shows the path of light beams through the eye when an ordinary magnifying glass (spectacles) is used.

FIG. 3 shows the path of light beams through a standard magnifying glass 15 and the eye 1. Light 10a incident on the magnifying glass 15, which is mounted in a spectacle frame, for example, is slightly focussed before it falls onto the lens 4 as light 10b via the cornea 9 and the iris 3. The light is subsequently focussed by the lens 4, causing it to fall on the macula or yellow spot 6, by which the person can see best.

Figure 4:
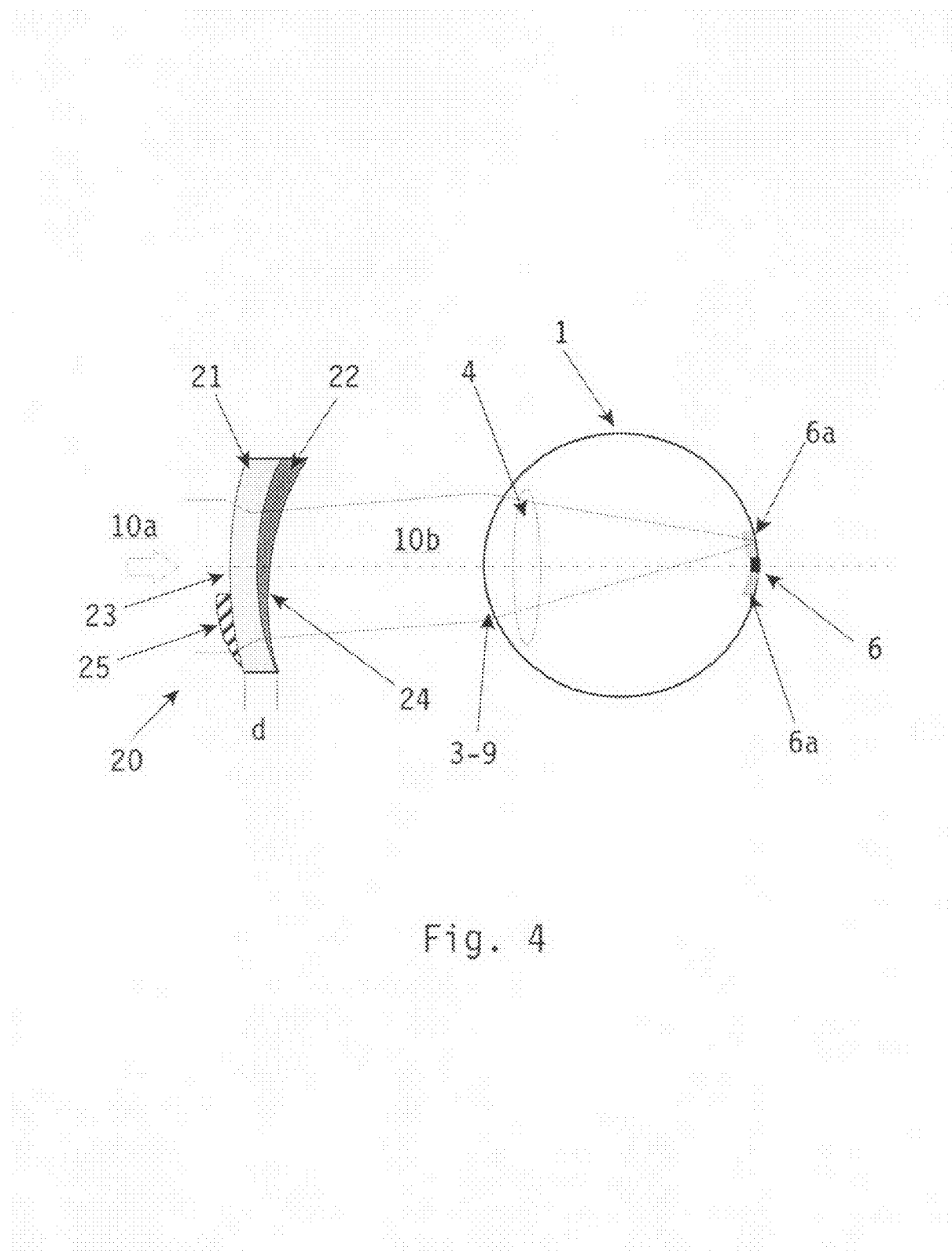
FIG. 4 shows the path of light beams through the eye when a magnifying glass according to the invention is used.

As already described in the introduction to this application, there are a large number of eye disorders that affect the functioning of the macula or yellow spot 6. These eye disorders can generally be categorised as Macular Degeneration, abbreviated MD. If the macula (or the fovea) 6 of the eye 1 is affected, and consequently this part of the retina 5 does not function optimally any more, the invention proposes to use a magnifying glass or lens as shown in the embodiment of FIG. 4. Said lens 20 is made up of a first lens part 21 and an additional lens part 22, which is disposed behind the first lens part 21, seen in the direction of the incident light 10a-10b. The lens 20 forms one integrated whole.

According to the invention, the lens part 22 is prismatic, i.e. it has a bilateral prism effect between 3 and 5 prism diopter with a 90° base.

According to the invention, the magnifying glass 20 furthermore has a front curve 23 having a value of 7.5-11 diopter. The correction of the front curve 23 of the magnifying glass 20 ranges between −4 diopter and +12 diopter in that case. More in particular, the front curve 23 or the back curve 24 is ground in the form of a cylindrical part, whose correction is maximally +4 diopter.

In a specific embodiment, the magnifying glass may be provided with an addition part 25 at the front curve 23, the correction of which addition part 25 is maximally +3.5 diopter.

The structure of the magnifying glass 20 according to the invention is such that the incident light 10a falls on the lens 4 as slightly shifted incident light 10b. This results in a focussing such that the focus is not located on the fovea (yellow spot or macula) 6 of the eye 1 but on the parafoveal part 6a around the fovea 6 of the eye.

In other words, the lens body of the magnifying glass 20 focusses the incident light in such a manner that the light around the fovea or macula 6 falls on the retina. Although only rods are present in the parafoveal part of the retina, these rods are much more light-sensitive than the cones that are present in the fovea or macula 6, and in addition they are linked together in groups. This enables the transmission of an even greater signal intensity to the brains via the optic nerve.

Although the rods are not capable of distinguishing colour, unlike the cones, the magnifying glass according to the invention shows an enlarged part of that which is perceived by the eye. The prism effect of the lens part 22 causes the image perceived by the wearer of the magnifying glass 20 according to the invention to be shifted downwards. The image is found to be steadier, however, and because the parafoveal part of the retina is now used, more details are perceived.

Since the rods are now activated for seeing, the wearer of the magnifying glass according to the invention generally has the impression of perceiving a more extensive and, in addition, steadier image exhibiting more contrast and less distortion.

More specifically, the thickness d of the magnifying glass 20 near the bottom edge of the magnifying glass is minimally 3.5 mm and maximally 4.5 mm.

As an accessory embodiment, the magnifying glass has an Essilor colour, which colour is generally indicated by number 850. Also Essilor colour 885 appears to be satisfactory. The special soft yellow colour of the magnifying glass is not found to be objectionable by the wearer. In addition, the daylight is filtered by the soft yellow colour so that the UV light will not trouble the wearer much, if at all.

The magnifying glass according to the invention is tripled non-glare, so that there will be no reflections on the rear side of the magnifying glass.

In further embodiments the prism part 21 has a monocular or a binocular prism effect.

In other specific embodiments, the magnifying glass according to the invention may be a monofocal, a bifocal, a trifocal or a multifocal magnifying glass.

The magnifying glass according to the invention as described above provides an adequately functioning alternative for Macular Degeneration patients. In particular, surgery can be postponed when using the magnifying glass according to the invention, because the magnifying glass according to the invention makes use of the parafoveal part of the retina, which still functions and activates this part to enable the patient to see better.

The invention claimed is:

1. A magnifying glass for a person having limited vision in one or both eyes, said magnifying glass comprising a lens body having a front curve that provides optical correction and a rear curve, said front and rear curves for focusing light rays incident upon the lens body onto the eye, and wherein the lens body is to be positioned before the affected eye, characterized in that the lens body comprises a prism part having a bilateral prism effect of 3-5 prism diopter with a 90° base, and wherein the magnifying glass comprises an addition part on the front curve that provides additional optical correction whose correction is maximally +3.5 diopter, such that the lens body focuses light rays incident on the lens body onto the parafoveal part of the fovea of the eye.

2. A magnifying glass according to claim 1, characterized in that the thickness of the lens body near the lower edge of the magnifying glass is minimally 3.5 mm.

3. A magnifying glass according to claim 2, characterized in that the thickness of the lens body near the lower edge of the magnifying glass is maximally 4.5 mm.

4. A magnifying glass according to claim 1, characterized in that the magnifying glass has a front curve of 7.5-11 diopter.

5. A magnifying glass according to claim 1, characterized in that the correction of the front curve of the magnifying glass ranges between −4 diopter and +12 diopter.

6. A magnifying glass according to claim 5, characterized in that the front curve and/or the back curve comprises a cylindrical portion, whose correction is maximally +4 diopter.

7. A magnifying glass according to claim 1, characterized in that the magnifying glass has an Essilor color number 850 or 885.

8. A magnifying glass according to claim 1, characterized in that the magnifying glass is tripled non-glare.

9. A magnifying glass according to claim 1, characterized in that the magnifying glass has a monocular or a binocular prism effect.

10. A magnifying glass according to claim 1, characterized in that the magnifying glass is a monofocal magnifying glass.

11. A magnifying glass according to claim 1, characterized in that the magnifying glass is a bifocal magnifying glass.

12. A magnifying glass according to claim 1, characterized in that the magnifying glass is a trifocal magnifying glass.

13. A magnifying glass according to claim 1, characterized in that the magnifying glass is a multifocal magnifying glass.

14. A spectacle frame provided with one or two magnifying glasses according to claim 1.

* * * * *